United States Patent
Chen et al.

(10) Patent No.: US 10,521,346 B2
(45) Date of Patent: Dec. 31, 2019

(54) ARITHMETIC PROCESSING APPARATUS AND CONTROL METHOD FOR ARITHMETIC PROCESSING APPARATUS

(71) Applicant: FUJITSU LIMITED, Kawasaki-shi, Kanagawa (JP)

(72) Inventors: Junlu Chen, Kawasaki (JP); Hideki Sakata, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/120,484

(22) Filed: Sep. 4, 2018

(65) Prior Publication Data
US 2019/0079863 A1    Mar. 14, 2019

(30) Foreign Application Priority Data

Sep. 11, 2017  (JP) ................................. 2017-173832

(51) Int. Cl.
| | | |
|---|---|---|
| G06F 12/00 | (2006.01) | |
| G06F 12/0802 | (2016.01) | |
| G06F 12/0817 | (2016.01) | |
| G06F 12/0811 | (2016.01) | |
| G06F 12/123 | (2016.01) | |

(52) U.S. Cl.
CPC ...... *G06F 12/0802* (2013.01); *G06F 12/0811* (2013.01); *G06F 12/0824* (2013.01); *G06F 12/0826* (2013.01); *G06F 12/123* (2013.01); *G06F 2212/1021* (2013.01); *G06F 2212/1024* (2013.01); *G06F 2212/60* (2013.01)

(58) Field of Classification Search
None
See application file for complete search history.

(56) References Cited

U.S. PATENT DOCUMENTS

2008/0313404 A1    12/2008   Tago et al.

FOREIGN PATENT DOCUMENTS

WO    2007/099643    9/2007

*Primary Examiner* — Midys Rojas
(74) *Attorney, Agent, or Firm* — Fujitsu Patent Center

(57) ABSTRACT

An arithmetic processing apparatus includes, a plurality of core memory groups, each of core memory groups including a plurality of arithmetic processing circuits, cache memory circuitry, shared by the plurality of arithmetic processing circuits, including a cache memory, a cache tag that stores a state of the cache memory, a tag directory that stores data possession information by a cache memory in another core memory group, and a memory access control circuit that receives a first memory access request from the cache memory circuitry and controls access to a memory other than a cache memory included in the cache memory circuitry, and a cache memory control circuit that receives a second memory access request from the arithmetic processing circuits and a third memory access request from the another core memory group and controls access to the cache memory.

10 Claims, 12 Drawing Sheets

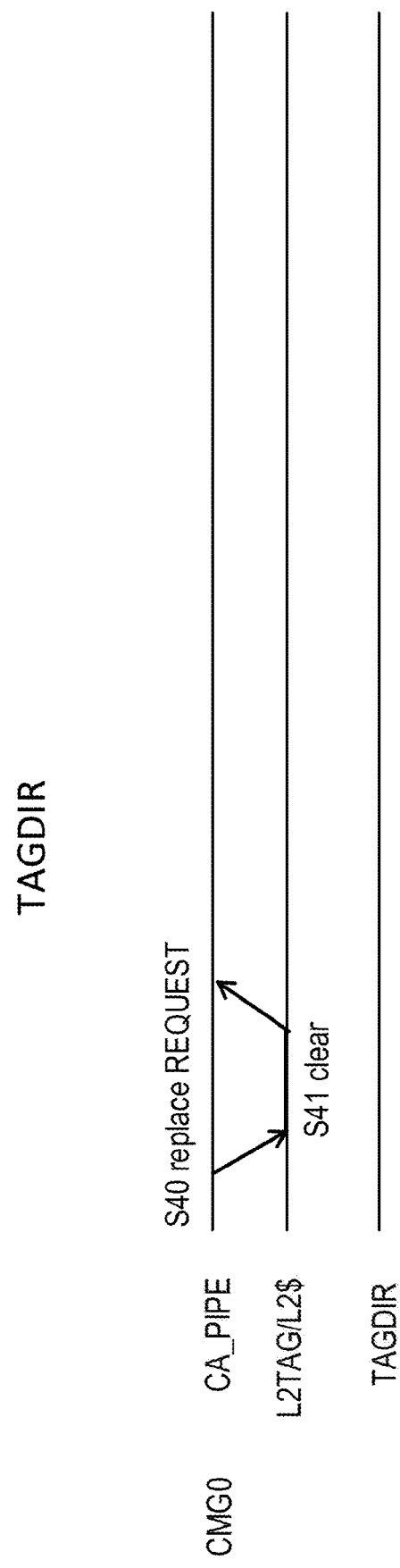

US 10,521,346 B2

ARITHMETIC PROCESSING APPARATUS AND CONTROL METHOD FOR ARITHMETIC PROCESSING APPARATUS

CROSS-REFERENCE TO RELATED APPLICATION

This application is based upon and claims the benefit of priority of the prior Japanese Patent Application No. 2017-173832, filed on Sep. 11, 2017, the entire contents of which are incorporated herein by reference.

FIELD

The embodiments discussed herein are related to an arithmetic processing apparatus and a control method for an arithmetic processing apparatus.

BACKGROUND

An arithmetic processing apparatus is a semiconductor chip of a highly integrated circuit called a CPU (Central Processing Unit) or a processor. Recent processors tend to be multi-cored with multiple processor cores as arithmetic processing circuits.

As for the multi-cored processor, a processor has been developed which has multiple core memory groups (CMGs) each including multiple cores, a last level cache (hereinafter referred to as an LL cache) shared by the multiple cores, and a memory access control circuit (MAC).

In the processor having the multiple CMGs, in order to maintain a cache coherency between the CMGs, each CMG includes a directory cache having data possession information indicating whether or not the data of memories managed by the own CMG and the other CMGs are possessed in an L2 cache. When a cache miss occurs in response to a memory access request, each CMG refers to the directory cache to determine whether the own CMG or the other CMGs possesses the data of the memory access request in a cache. When any of the other CMGs possesses the data, the own CMG issues a data request to the other CMG to export the data in the L2 cache.

In the processor having the multiple CMGs, each CMG sets a home agent between the LL cache and the memory access controller, and sets the directory cache recording the possession information indicating whether or not the data of memories managed by the own CMG are possessed by the own CMG and the other CMGs, in the home agent. In this manner, when the directory cache having the data possession information of all the CMGs is set in the home agent in each CMG, a memory access request from all the CMGs is input to a pipeline circuit of the home agent to determine whether or not the home agent issues a data export request to another CMG.

However, as the recent evolution of multicore has been further progressed, the number of CMGs has increased, which imposes a heavy burden on the circuit scale of the directory cache in the home agent set in each CMG and the number of processes performed by the pipeline of the home agent.

Related techniques are disclosed in, for example, International Publication Pamphlet No. WO2007/099643.

SUMMARY

According to an aspect of the embodiments, an arithmetic processing apparatus includes, a plurality of core memory groups, each of core memory groups including a plurality of arithmetic processing circuits, cache memory circuitry, shared by the plurality of arithmetic processing circuits, including a cache memory, a cache tag that stores a state of the cache memory, a tag directory that stores data possession information by a cache memory in another core memory group, and a memory access control circuit that receives a first memory access request from the cache memory circuitry and controls access to a memory other than a cache memory included in the cache memory circuitry, and a cache memory control circuit that receives a second memory access request from the arithmetic processing circuits and a third memory access request from the another core memory group and controls access to the cache memory.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 12 is a view illustrating a replacement processing in the tag directory scheme of FIG. 3 according to the present embodiment.

DESCRIPTION OF EMBODIMENTS

Figure 1:
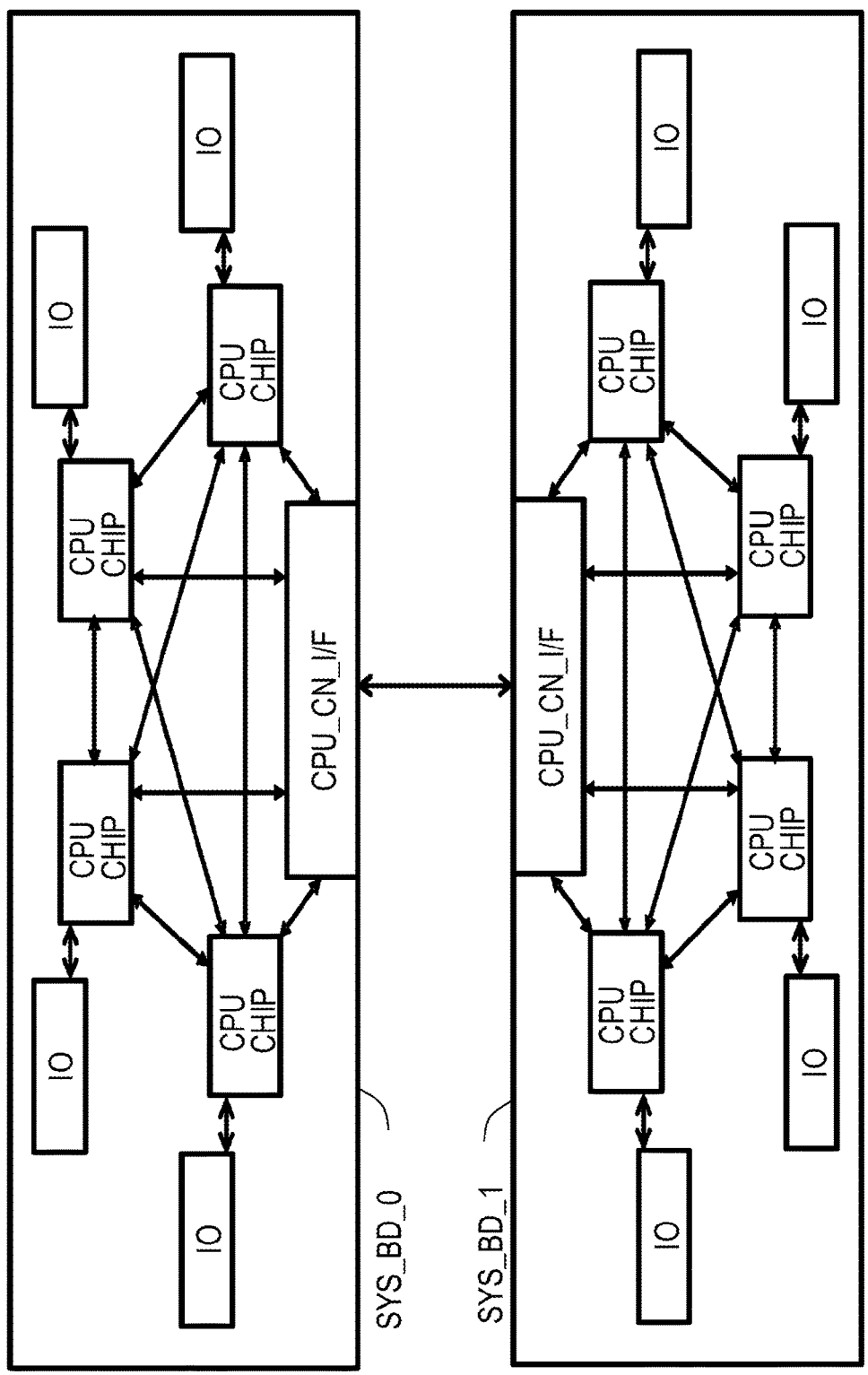
FIG. 1 is a view illustrating an example of the configuration of a multiprocessor server system having a processor according to an embodiment.

FIG. 1 is a view illustrating an example of a configuration of a multiprocessor server system having a processor according to an embodiment. The multiprocessor server system has, for example, two server system boards SYS_BD_0 and SYS_BD_1, which are interconnected via their respective CPU connection interface CPU_CN_IF. Each server system board includes, for example, four processors (or CPU chips) CPU_CHIP as arithmetic processing apparatuses, input/output devices IO corresponding to the four processors, respectively, and a CPU connection interface CPU_CN_IF. The four processors CPU_CHIP are connected to the respective input/output devices IO, and further, the four processors are interconnected so as to communicate with each other. The four processors are also connected to four processors on each of the other server system boards via the CPU connection interface CPU_CN_IF.

Figure 2:
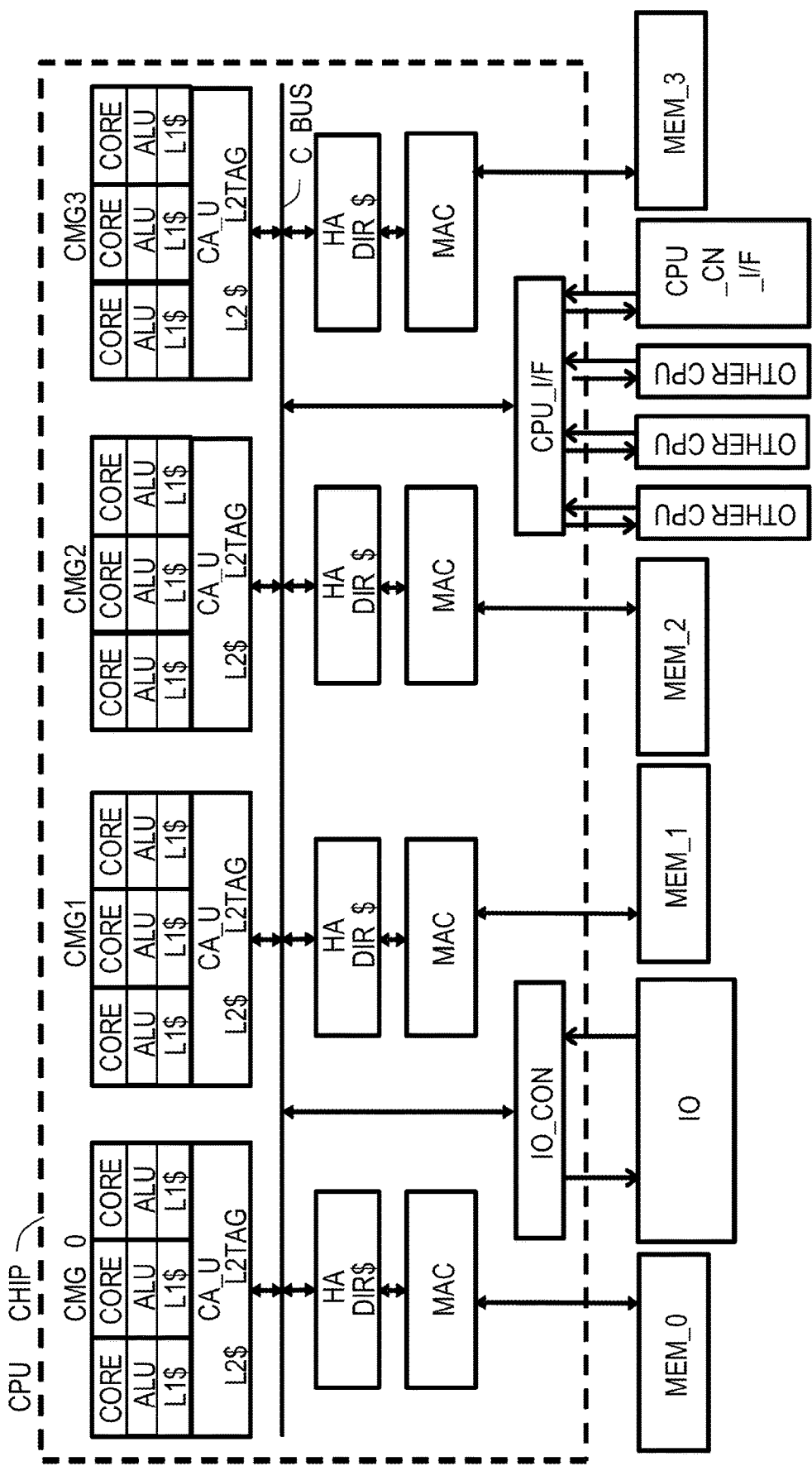
FIG. 2 is a view illustrating the configuration of a processor according to the embodiment before an improvement.

FIG. 2 is a view illustrating the configuration of a processor according to the present embodiment before an improvement. In FIG. 2, the processor CPU_CHIP includes, for example, 12 processor cores CORE as arithmetic processing circuits, and each of the four core memory groups CMG includes three processor cores CORE, a cache circuitry CA_U shared by the three processor cores, a home agent HA, and a memory access control circuit MAC. The memory access control circuit MAC controls a memory access to main memories MEM-1 to MEM-3 of addresses managed by the respective core memory groups CMG. Each core memory group CMG may be regarded as one node. Hereinafter, the core memory group will be simply referred to as CMG.

Each processor core CORE has an arithmetic processing circuit ALU and a first level cache L1$. The cache circuitry CA_U shared by the plural processor cores is a second level cache circuitry or a last level cache circuitry. The cache circuitry CA_U has an L2 cache memory L2$ for storing data and an L2 cache tag L2TAG for storing the state of a cache block in which data of the L2 cache memory is stored.

The home agent HA has a directory cache DIR$ that stores directory information which is data possession information of the L2 cache memories of the four CMGs, and intensively manages a control of a determination of CMG possessing data of a memory access request and a data response to the CMG. An inter-CMG bus C_BUS enabling a communication among the four CMGs is provided. The L2 cache circuitry CA_U in each CMG issues a memory access request to the other CMG's home agents via the inter-CMG bus C_BUS, and the other CMG's home agents read out data for the memory access request from the L2 cache memory L2$ or the main memory, and make a data response to the CMG of the memory access request source via the inter-CMG bus C_BUS.

In response to the memory access request from the home CMG's L2 cache circuitry CA_U, the home agent HA refers to the directory cache DIR$ to check whether or not the cache memories of the other CMGs possess the data of the memory access request. When the CMGs possess the data, the home agent issues a data request for requesting the CMGs to export data in the cache memory.

Meanwhile, in response to the memory access request from a local CMG's home agent, the home agent refers to the directory cache to check whether or not the home CMG's cache memory possesses the data of the memory access request. When the home CMG possesses the data, the home agent HA issues a data read-out order to the cache circuitry CA_U, reads out data from the L2 cache memory L2$, and responds to a remote CMG with the read data.

When the cache memory of the home CMG does not possess data, the home agent refers to the directory cache DIR$ to check whether or not another CMG possesses the data.

When another CMG (remote CMG) possesses the data, the home agent issues a data request to request the remote CMG to export the data in the cache memory. Thereafter, the home agent receives a data response to the data request from the remote CMG and responds to the remote CMG with data.

When the other CMGs also do not possess the data, the home agent accesses the main memory via the memory access control circuit MAC, reads out the data, and responds to the remote CMG with the read data.

In FIG. 2, the home agent HA of each CMG has the directory cache DIR$ that stores all of the data possession information of the local cache memory and the data possession information of the cache memories of the remote, that is, other CMGs. Further, the home agent HA has a home agent pipeline control circuit. The pipeline control circuit checks the directory cache DIR$ in response to the memory access request, and issues a data response to the other CMGs or a memory access request to the memory access control circuit MAC in response to the check result. Therefore, as the number of CMGs increases due to the multicore, the amount of integrated circuits of the home agent HA increases. In addition, since the L2 cache circuitry CA_U checks the cache tag L2TAG in response to the memory access request, and further, the home agent HA checks the directory cache DIR$ in response to the memory access request, the number of processing processes for the memory access request increases.

EMBODIMENTS

Figure 3:
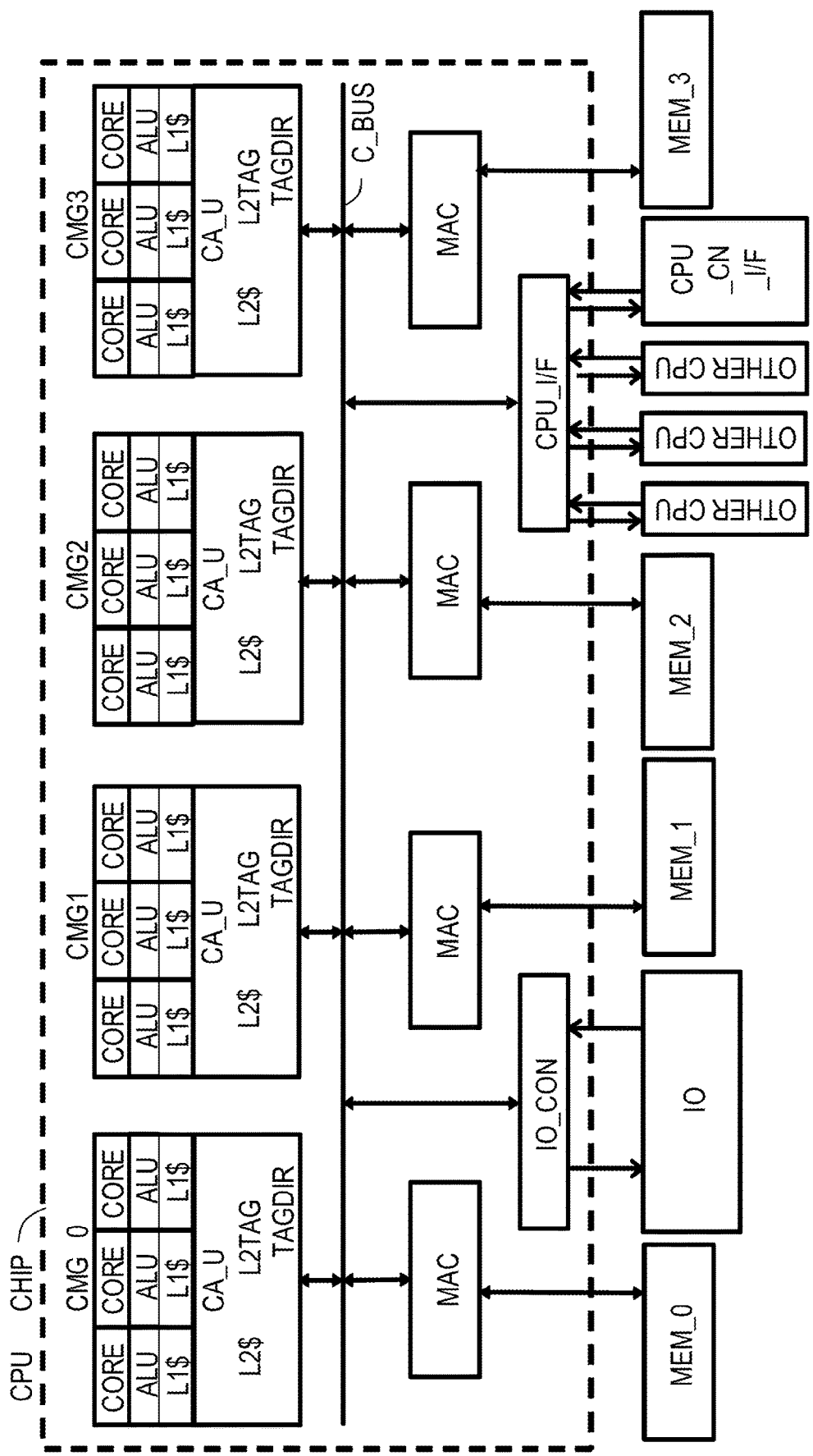
FIG. 3 is a view illustrating the configuration of a processor according to the embodiment.

FIG. 3 is a view illustrating the configuration of a processor according to an embodiment. The processor of the present embodiment also performs a ccNUMA cache coherency control between plural CMGs in a processor chip, as in FIG. 2.

As in FIG. 2, this processor CPU_CHIP includes, for example, 12 processor cores CORE, and each of the four core memory groups CMG includes three processor cores CORE, a cache circuitry CA_U shared by the three processor cores, a home agent HA, and a memory access control circuit MAC. Each MAC issues a request for a memory access to main memories MEM-0 to MEM-3 of addresses managed by the respective CMGs.

As in FIG. 2, each processor core CORE includes an arithmetic processing circuit ALU and a first level cache L1$. Each processor core issues a memory access request which is an access to the main memory by a load store circuit (not illustrated).

In each CMG, the cache circuitry CA_U of a second level or last level (LL) shared by the three processor cores CORE has an L2 cache memory L2$ that stores data and an L2 cache tag L2TAG that stores the data state of the L2 cache memory, as in FIG. 2. Further, unlike FIG. 2, the cache circuitry CA_U has a tag directory TAGDIR that stores data possession information including the presence/absence of data possession by the L2 cache memory of another CMG, that is, remote CMG.

In response to an input memory access request, a cache control circuit (not illustrated) in the cache circuitry CA_U refers to the L2 cache tag L2TAG to perform a cache hit determination as to whether or not the L2 cache memory L2$ of the home CMG stores the data of the memory access request. When a cache miss occurs, the cache control circuit refers to the tag directory TAGDIR to check whether or not the cache memory L2$ of another CMG, that is, remote CMG.

When the cache hit determination is a cache hit, the cache circuitry CA_U reads out the data of the cache memory L2$ and responds to the memory access request source with the read data. When the tag directory is hit (in possession), the cache circuitry CA_U issues a data request to a cache control circuit of a CMG possessing the data, registers the responded data in its own cache memory, and responds to the processor core with the data. In the case of a memory access request from a local CMG, a cache control circuit of a CMG possessing the data responds to the cache control circuit of the local CMG with the data and makes a data response completion report to the home CMG. These processes will be described later in detail.

As described above, firstly, the tag directory TAGDIR storing the data possession information of the remote CMG is installed in the cache circuit CA_U of the shared cache of each CMG. For example, in the case of CMG0, the tag directory TAGDIR of CMG0 stores data possession information of CMG1, CMG2 and CMG3, and the L2 cache tag L2TAG stores data possession information of its own CMG0. Therefore, by checking the tag directory TAGDIR and the L2 cache tag L2TAG together, the cache control circuit may check the data possession information by the cache memories of all the CMGs.

Further, although the directory cache DIR$ of each CMG in FIG. 2 holds the possession information for the four CMGs, the tag directory TAGDIR of the present embodiment has only to hold possession information for three CMGs, reducing the capacity of the tag directory TAGDIR of each CMG to three quarters. Moreover, when the frequency of data export of the home CMG by the remote CMG is not so high, the capacity of the tag directory TAGDIR of each CMG may be further reduced in some cases. As a result, the circuit scale of each CMG may be reduced.

Secondly, the cache control circuit of the pipeline structure in the cache circuitry CA_U of the present embodiment has the function of checking the directory cache DIR$ of the pipeline control circuit in the home agent of FIG. 2. As a result, there is no need to install a home agent. Further, when a cache miss occurs in the L2 cache tag L2TAG, the cache control circuit in the cache circuitry can check the tag directory TAGDIR without inputting a request to the pipeline control circuit of the home agent, which can result in increase of a processing speed.

Figure 4:
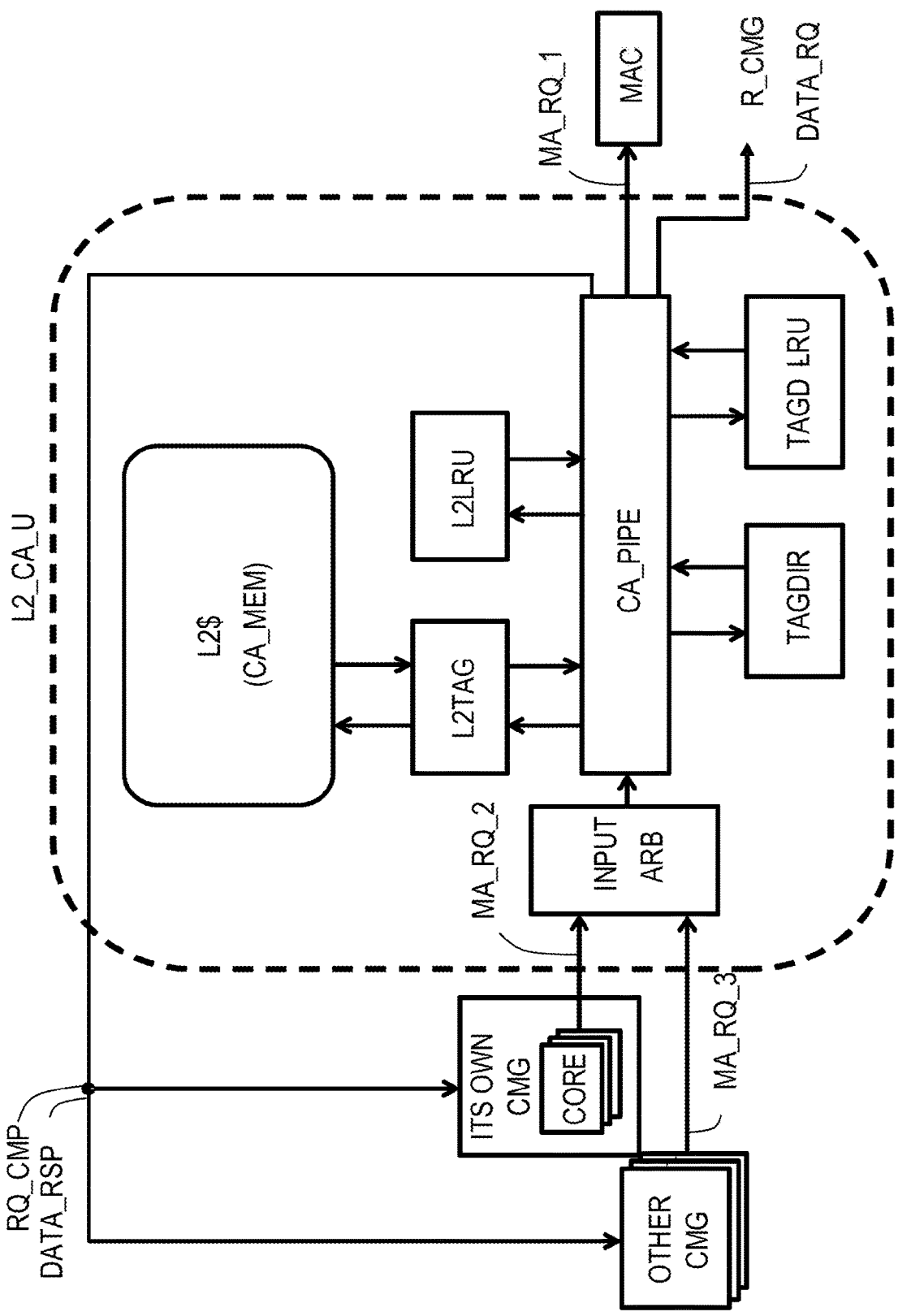
FIG. 4 is a view illustrating the configuration of a cache circuitry.

FIG. 4 is a view illustrating the configuration of a cache circuitry. A cache circuitry L2_CA_U of the L2 cache includes an input arbitration circuit INPUT_ARB which selects a memory access request and inputs the request to a pipelined cache control circuit CA_PIPE. The input arbitration circuit includes a request queue for registering, for example, a memory access request. The input arbitration circuit registers a second memory access request MA_RQ-2 from the core of its own CMG and a third memory access request MA-RQ-3 from the core of another CMG in the request queue and selects one of these registered requests based on predetermined criteria.

The cache circuitry L2_CA_U further includes an L2 cache memory L2$ that stores possession data of its own CMG and an L2 cache tag L2TAG that stores the data state in the L2 cache memory. The data state is, for example, one of invalid (I), exclusive (E), shared (S), and modified (M) according to an MESI protocol.

The cache circuitry L2_CA_U further includes a tag directory TAGDIR that stores data possession information on whether or not the L2 cache memory of another CMG has data of the main memory managed by its own CMG. The data possession information of the tag directory is, for example, invalid (I), exclusive (E), or shared (S).

When the L2 cache memory L2$ and the L2 cache tag L2TAG have, for example, a 16 Way configuration, an L2LRU selection circuit L2LRU for selecting that Way is provided. Accordingly, a cache block of a Way having the oldest data is selected as a replacement target. Likewise, when the tag directory TAGDIR has only the capacity of the index number smaller than the total number of indexes of the other three CMGs, it is necessary to replace the indexes of the tag directory. To this end, an LRU selection circuit TAGD_LRU of the tag directory for the way selection is provided. In a case where the tag directory TAGDIR has the capacity of the same index number as the total number of indexes of the other three CMGs, even when the cache memories of the other CMGs possess data corresponding to the total number of indexes, the tag directory TAGDIR can store all possession information. In that case, the LRU selection circuit of the tag directory is not necessary.

The operation of the cache circuitry will be briefly described below. The input arbitration circuit INPUT_ARB arbitrates the memory access requests MA_RQ_2 and MA_RQ_3 from the processor core CORE of its own CMG and the L2 cache control circuits of the other CMGs and sequentially injects (input) them into a cache control circuit CA_PIPE.

In response to an input memory access request, the cache control circuit first searches the L2 cache tag L2TAG and performs a cache hit determination. In the case of a cache hit, it can be solved by the cache circuitry in its own CMG, and the cache control circuit extracts data from the L2 cache memory L2$ without checking the tag directory TAGDIR and sends a data response DATA_RSP to the core or cache control circuit of the CMG of the request source.

Meanwhile, in the case of a cache miss, it cannot be solved by the cache circuitry in its own CMG, and the cache control circuit checks the tag directory TAGDIR to determine whether or not the cache memory of the remote CMG possesses the requested data.

When the result of this determination is a hit in the tag directory, this means that the remote CMG possesses the data. Therefore, the cache control circuit issues a data request DATA_RQ to the remote CMG, exports data possessed by the L2 cache to the cache control circuit of the remote CMG, and requests the memory access request source to respond with data. Then, upon receiving the data response from the remote CMG, the cache control circuit registers the data response in the own L2 cache, updates the possession information of the tag directory, and responds to the processor core of the memory access request source with the data. Alternatively, upon receiving a data response completion report, the cache control circuit updates the possession information of the tag directory.

When a miss occurs in the tag directory, the cache control circuit issues a memory access MA_RQ_1 to the memory access controller MAC and acquires data from the main memory. Then, the cache control circuit responds to the requesting source CMG with the acquired data and updates the possession information of the tag directory.

Figure 5:
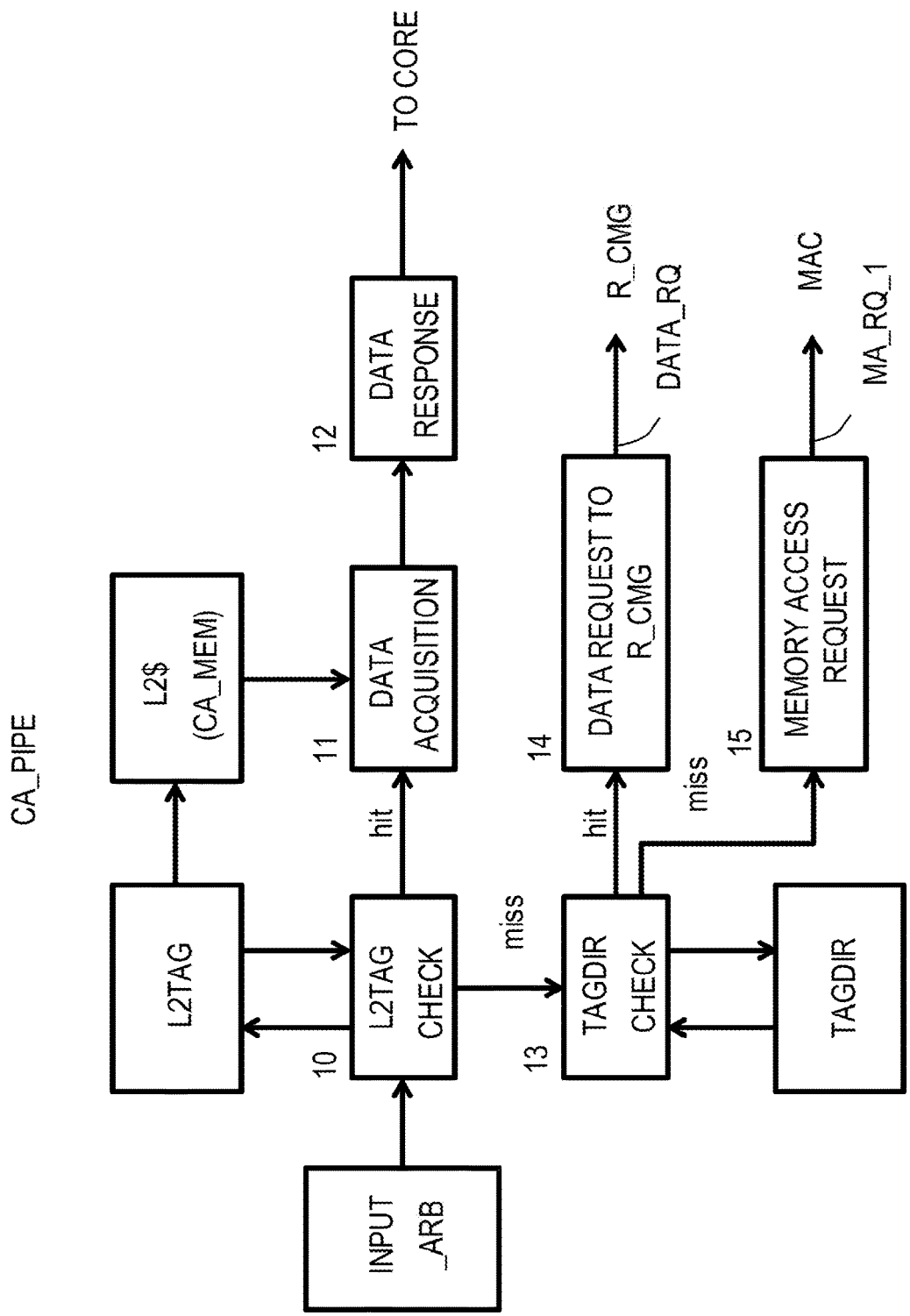
FIG. 5 is a view illustrating an example of a pipeline structure of a cache control circuit.

FIG. 5 is a view illustrating an example of a pipeline structure of a cache control circuit. As illustrated in FIG. 5, when the input arbitration circuit INPUT_ARB inputs a memory access request to the cache pipeline, as described above, an L2TAG check circuit 10 that checks the L2 cache tag searches L2TAG to perform a cache determination. When the cache determination is a hit, a data acquisition circuit 11 reads out hit data from the L2 cache memory L2$, and a data response circuit 12 makes a data response to the core or cache control circuit of the request source.

Meanwhile, when the cache determination is a miss, a tag directory check circuit 13 searches the tag directory TAGDIR to determine whether or not the L2 cache memory of another CMG (remote CMG) possesses data. When this determination is a hit, a data request circuit 14 issues a data request DATA_RQ to the remote CMG (R_CMG). Meanwhile, when the determination is a miss, a memory access request circuit 15 issues a memory access request MA_RQ-4 to the memory access control circuit MAC.

As illustrated in FIG. 5, the L2 cache tag L2TAG and the tag directory TAGDIR are installed in the L2 cache circuitry, and the L2 cache tag and the tag directory can be checked with pipeline processing by the same cache control circuit CA_PIPE.

Figure 6:
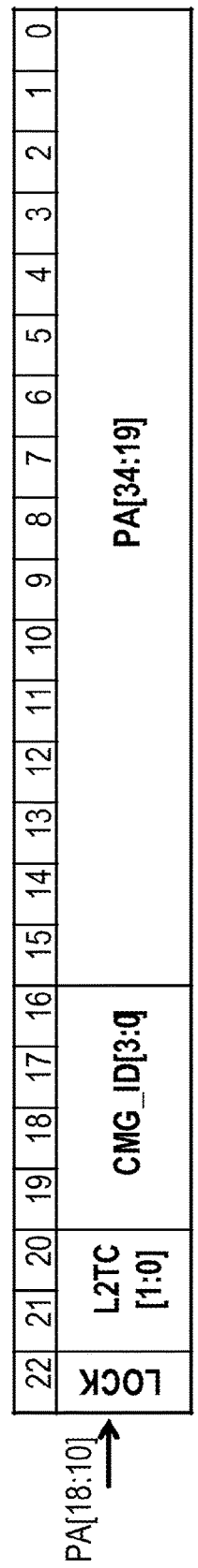
FIG. 6 is a view illustrating the format of a tag directory.

FIG. 6 is a view illustrating the format of a tag directory. Among 36-bit memory addresses, the lower memory addresses PA [18:10] are used as the indexes of the tag directory. A lock flag LOCK, a data possession state L2TC in the L2 cache of the remote CMG, CMG identification information CMG_ID indicating which remote CMG possesses data, the higher memory addresses PA [34:19] are registered in each index of the tag directory. The CMG identification information CMG_ID indicates that, for example, 4 bits correspond to 4 CMGs (CMG0 to CMG3), respectively, and each corresponding CMG possesses data when each bit is "1" and possesses no data when each bit is "0."

The data possession state L2TC has, for example, the following three states. L2TC=00: non-possession (I), L2TC=01: multiple CMGs possess data in in a shared state (S), L2TC=11: certain CMG possesses data in an exclusive state (E). Here, the exclusive state (E) does not necessarily determine whether or not the data possessed by a CMG has been modified (M) without checking the L2 cache tag of the CMG. It may be possible to distinguish between the exclusive state (E) and the modified state (M) in the data possession state L2TC.

The data possession information of all the remote CMGs may be known from this data holding state L2TC together with the CMG identification information CMG_ID indicating which remote CMG possesses data. For example, L2TC[1:0]=01 and CMG_ID[3:0]=1001 indicate that CMG0 and CMG3 possess data in a shared state. L2TC[1:0]=11 and CMG_ID[3:0]=0010 indicate that CMG 2 possesses data in an exclusive state.

A lock flag LOCK indicates that a certain one CMG has already checked the tag directory TAGDIR, detects that another CMG possesses data, and is issuing a data request DATA_RQ to the another CMG. LOCK=1 indicates that the data of the index is locked. In this case, when a data response to the data request is received, there is a possibility that the possession information of the tag directory TAGDIR is modified. Therefore, when a memory access request from another CMG is hit with the same index during locking, the memory access request is aborted and the request queue in the input arbitration circuit waits until the update processing of the tag directory for the already processed data request is completed. This makes it possible to access the latest data possession information in response to a later memory access request.

Specifically, when a data request is issued to another CMG3 by the CMG0 previously hit in the tag directory TAGDIR, the data possessed by the cache memory of the another CMG3 is exported, and the state of the L2 cache tag of the another CMG3 is changed to "Invalid." Accordingly, there is a possibility that the state of the tag directory TAGDIR of the CMG0 is also changed to "Invalid." Therefore, when the tag directory hits in the previous memory access request, the cache control circuit changes the lock flag of this index to LOCK=1 and issues a data request. Processing based on possession information of the tag directory TAGDIR by another CMG is prohibited until this processing is completed.

The cache control circuit accesses the tag directory TAGDIR, reads out the registration information of the index PA [18:10] equal to the address AD [18:10] of the memory access request, and compares the read address PA [34:19] with the address AD [34:19] of the memory access request. When there is a match, it is a hit of TAGDIR. In that case, it is possible to detect the possession state of a certain CMG from CMG_ID [3:0] and L2TC [1:0].

Figure 7:
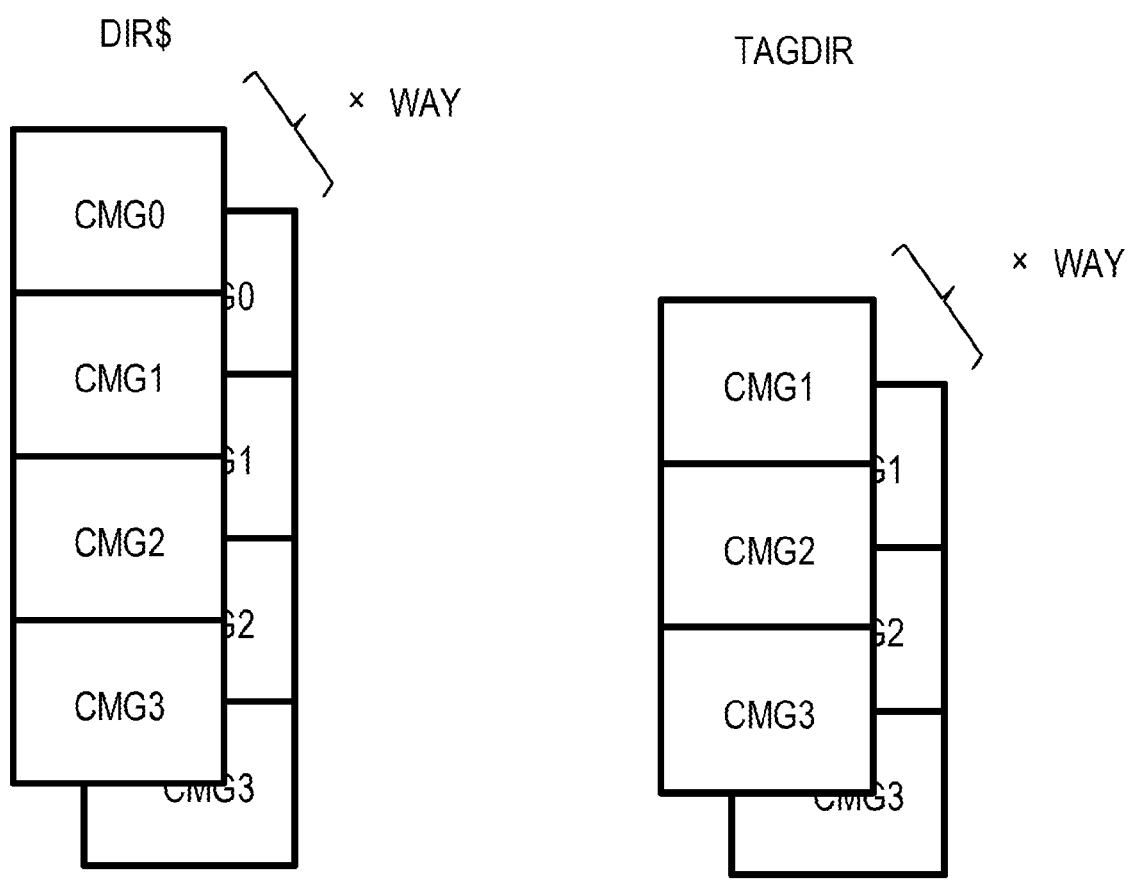
FIG. 7 is a view illustrating a comparison between the configuration of a tag directory and a directory cache.

FIG. 7 is a view illustrating a comparison between a tag directory and a directory cache in configuration. The directory cache DIR$ in FIG. 2 is installed in the home agent and stores the data possession information by the L2 caches of all the CMGs. Therefore, the directory cache ideally has the number of indexes enough to store the data possession information of the four CMGs. In addition, the directory cache has the same number of Ways as that of the L2 cache.

Meanwhile, in the case of the processor of FIG. 3 according to this embodiment, since the data possession information by the L2 cache of its own CMG is stored in the L2 cache tag in the L2 cache circuitry, the tag directory TAGDIR stores the data possession information by the L2 cache of another CMG, that is, remote CMG and does not store the data possession information by the L2 cache of the own CMG. Therefore, the tag directory TAGDIR may have at most the number of indexes enough to store the data possession information of three CMGs. To that extent, the memory capacity of the tag directory can be reduced. The tag directory also has the same number of Ways as that of the L2 cache.

The probability that the L2 cache of the remote CMG possesses the data of the memory managed by its own CMG may not be high although it depends on an application to be executed. For example, it is rare that all the data possessed by the L2 cache of the remote CMG is the memory data managed by another CMG. Accordingly, the necessity of making the number of indexes of the tag directory TAGDIR equal to the total number of indexes of L2 cache tags of the three CMGs is not so high. Therefore, the number of indexes of the tag directory may be smaller than the total number of indexes of L2 cache tags of the three CMGs. For example, it may be the total number of indexes of two CMGs.

However, in that case, as the number of memory data exported by another CMG increases, the number of indexes of the tag directory becomes insufficient, which may make it necessary to replace the data possession information. When the replacement occurs, the tag directory LRU selection circuit TAGD_LRU selects a Way to be replaced.

[Operation of Read Request and Data Request to Remote CMG]

Figure 8:
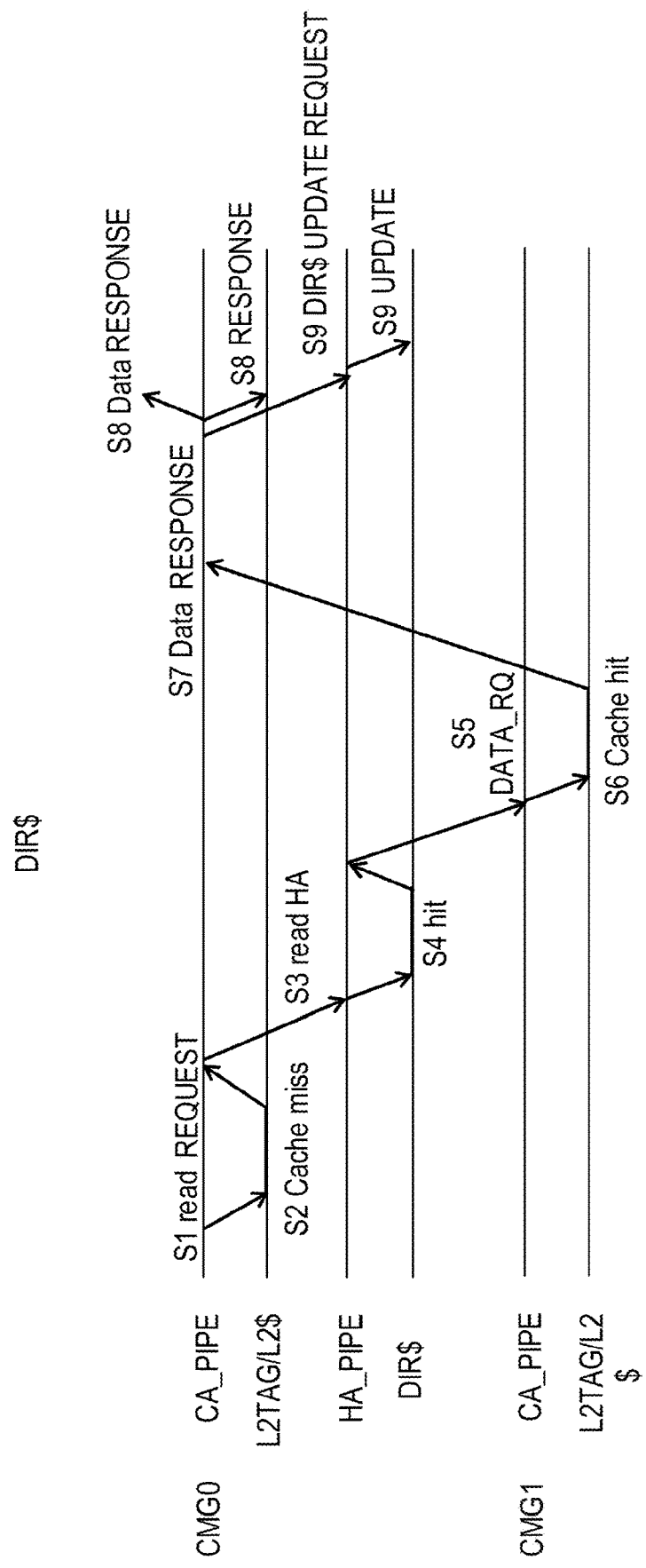
FIG. 8 is a view illustrating processing of a read request in the directory cache DIR$ scheme of FIG. 2 and a data request to a remote CMG.

FIG. 8 is a view illustrating the processing of a read request in the directory cache DIR$ scheme of FIG. 2 and a data request to a remote CMG. A read request from the processor core of the home CMG0 is input to the pipeline of the cache control circuit CA_PIPE of the L2 cache circuitry (S1). Then, the cache control circuit searches the L2 cache tag L2TAG and a cache miss occurs (S2). In response thereto, the cache control circuit outputs a read request to the home agent HA (S3), and the read request is input to the pipelined HA control circuit HA_PIPE in the home agent. The HA control circuit searches the directory cache DIR$. When hit, it turns out that another (remote) CMG1 possesses data (S4).

Then, the HA control circuit HA_PIPE outputs a data request to the remote CMG1 (S5), and the cache control circuit CA_PIPE of the L2 cache of the remote CMG1 searches the L2 cache tag L2TAG and hits (S6). Then, the cache control circuit reads out the data in the L2 cache memory and responds to the home CMG with the read data (S7). In response to this, the cache control circuit CA_PIPE of the home CMG0 registers data and its state information in the L2 cache memory L2$ and the L2 cache tag L2TAG and requests the home agent to update the possession information of the directory cache DIR$ in response to the processor core of the read request source with the data (S9).

Figure 9:
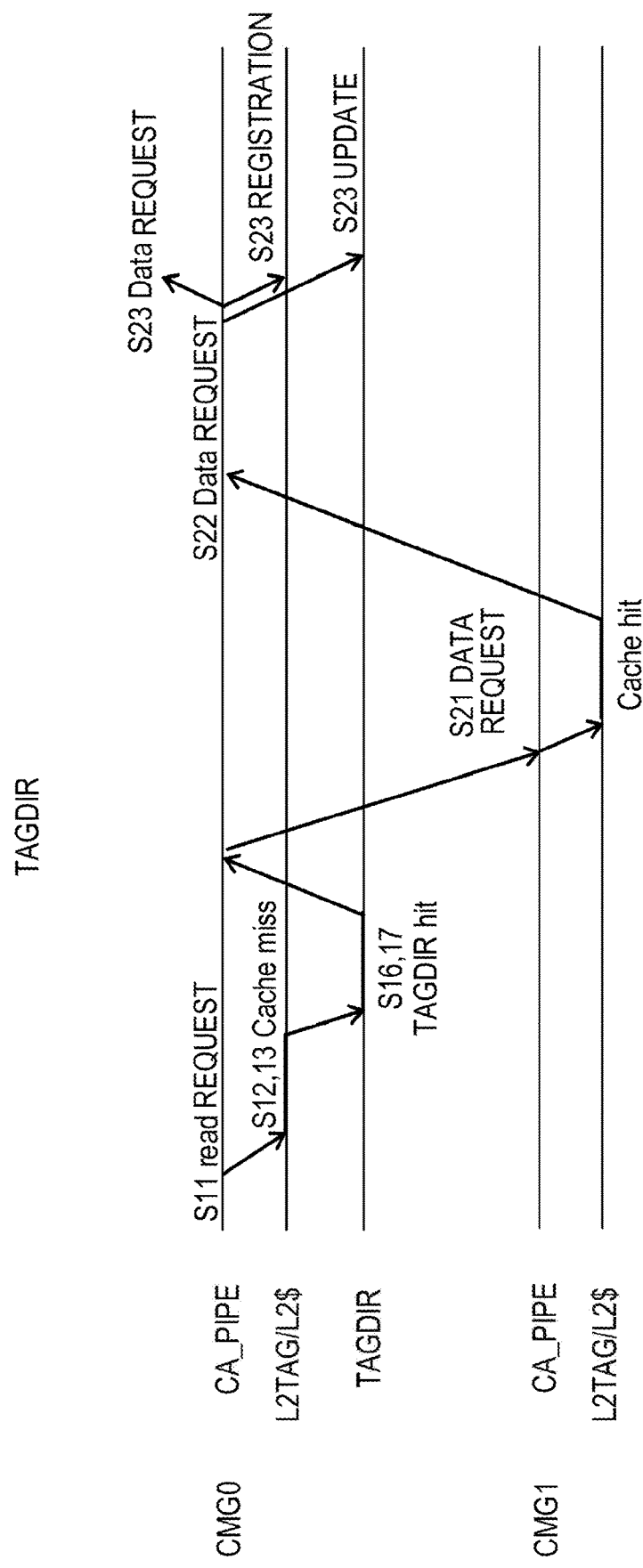
FIG. 9 is a view illustrating processing of a read request in the tag directory TAGDIR scheme of the present embodiment and a data request to a remote CMG.
Figure 10:
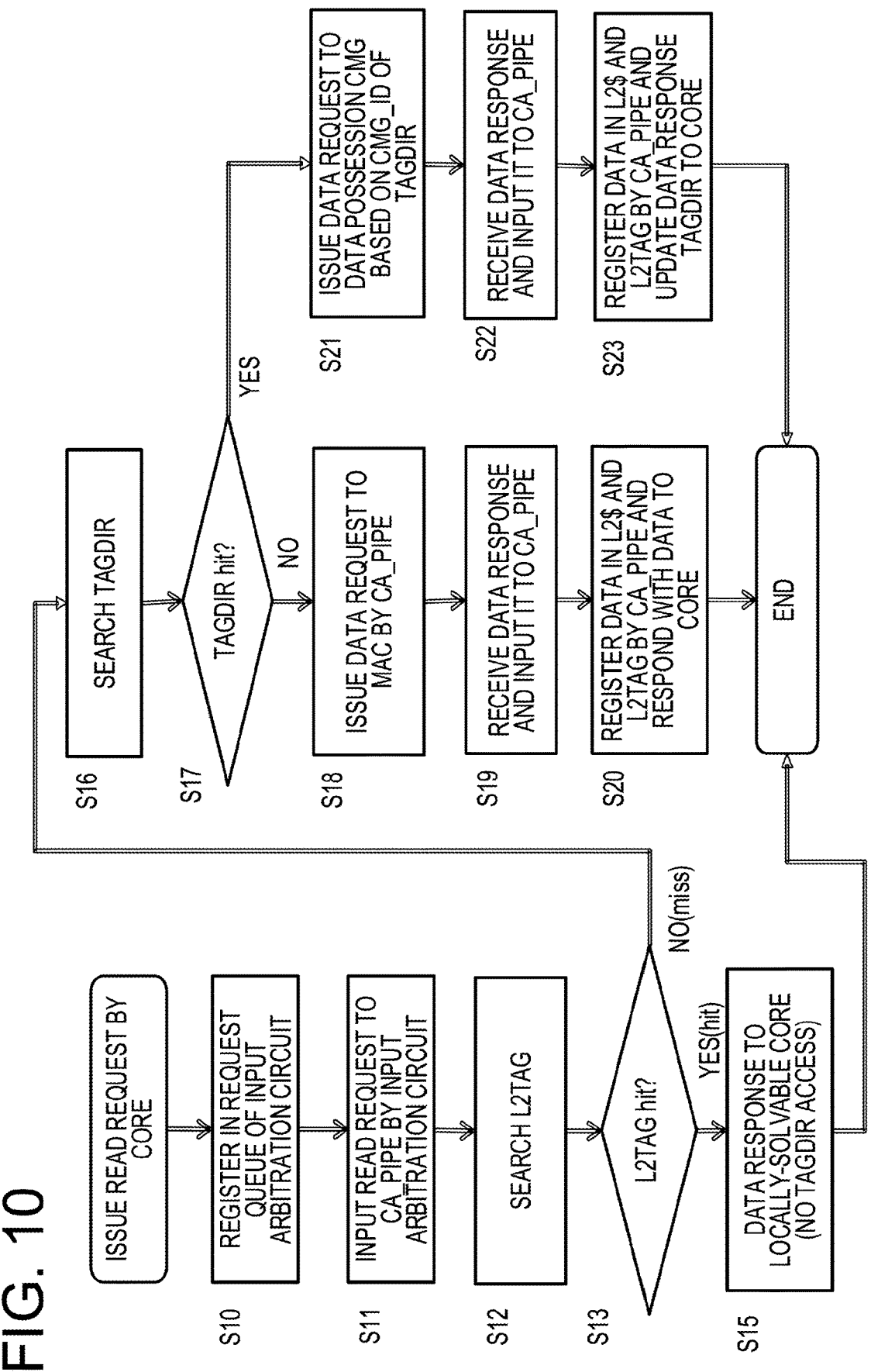
FIG. 10 is a flowchart illustrating a processing for a read request in the same tag directory scheme.

FIG. 9 is a view illustrating the processing of a read request in the tag directory TAGDIR scheme according to this embodiment and a data request to a remote CMG. FIG. 10 is a flowchart illustrating the processing for a read request in the same tag directory scheme. FIG. 9 will be first described, and FIG. 10 will then be described. It is to be noted that FIG. 9 has the same operations S11 to S23 as those in FIG. 10.

In FIG. 9, a read request from the processor core of the home CMG0 is input to the pipeline of the cache control circuit CA_PIPE of the L2 cache circuitry (S11). Then, the cache control circuit searches the L2 cache tag L2TAG and a cache miss occurs (S12). The processing up to this point is the same as in FIG. 8.

Here, the cache control circuit searches the tag directory TAGDIR and hits in the tag directory to turn out that one of the other CMGs possesses data and that the remote CMG1 is processing data from the CMG identification information CMG_ID in the tag directory (S16 and S17). As illustrated in FIG. 8, there is no need to search the directory cache DIR$ via the home agent, which increase the processing speed.

As a result of hitting in the tag directory, the cache control circuit CA_PIPE of the home CMG0 issues a data request to the remote CMG1 (S21). This is because it takes less time to acquire data by responding with data from the remote CMG1 rather than accessing the main memory of the home CMG0 to acquire data.

Then, a data request is input to the cache control circuit CA_PIPE of the remote CMG1 which then searches the L2 cache tag for a cache hit, reads out data from the L2 cache memory L2$, and responds with data to the cache control circuit CA_PIPE of the home CMG0 (S22).

At this time, when the possession state is Exclusive (E) in the tag directory in the home CMG 0, the data is Exclusive (E) or Updated (M) in the remote CMG1, and the cache control circuit of the remote CMG1 changes the L2 cache tag to Invalid and discharges data.

Upon receiving the data response, the cache control circuit CA_PIPE of the home CMG0 registers data in the L2 cache memory L2$ and registers a tag in the L2 cache tag L2TAG in response to the core of the read request source with data (S23). At the same time, the cache control circuit changes the possession information by CMG1 of the tag directory TAGDIR to Invalid (S23).

Meanwhile, when the possession state is Shared (S) in the tag directory of the home CMG0, the data state is also Shared (S) in the remote CMG1, and the cache control circuit of the remote CMG1 exports data with the L2 cache tag Shared (S) without being changed.

Upon receiving the data response, the cache control circuit CA_PIPE of the home CMG0 registers data in the L2 cache memory L2$ and registers a tag in the L2 cache tag L2TAG in response to the core of the read request source with data (S23). However, the possession information by CMG 1 of the tag directory TAGDIR is Shared (S) without being changed.

When the first memory access request is issued from the local CMG, for example, CMG2, the remote CMG responds with data directly to the local CMG 2 or responds with data to the home CMG0 in response to a data request from the home CMG0. In the former case, the home CMG0 receives a completion response with no data, and updates the possession state of the tag directory if necessary. In the latter case, the home CMG0 further responds with data to the local CMG2 and updates the possession information of the tag directory to the state possessed by the local CMG2.

As described above, in the tag directory scheme (FIG. 3) according to the present embodiment, the function of the HA control circuit of the home agent is integrated in the cache control circuit, and the tag directory TAGDIR storing only the data possession information of other CMGs is set in the L2 cache circuitry. As a result, the arithmetic processing apparatus (CPU chip) of the present embodiment can reduce the capacity of the tag directory storing the data possession information of other CMGs, so that the cache control circuit can access the L2 cache tag L2TAG and the tag directory TAGDIR by the same pipeline circuit, thereby shortening the hit latency and improving the performance.

Next, the operation in the tag directory scheme for a read request will be described with reference to FIG. 10. First, when the processor core of the home CMG or the L2 cache control circuit of the local CMG issues a read request, the read request is registered in the request queue of the input arbitration circuit of the home CMG (S10). Then, the input arbitration circuit inputs the read request to the cache control circuit CA_PIPE of the L2 cache through arbitration (S11).

Next, the cache control circuit searches the L2 cache tag L2TAG for the read request (S12). When a cache hit occurs ("YES" in S13), the read request can be processed locally, and the cache control circuit reads out data from the L2 cache memory and responds with data to the read request source (S15). In this case, it is not necessary to access the tag directory TAGDIR to check the data possession information of other CMGs.

Meanwhile, when a cache miss occurs ("NO" in S13), the cache control circuit CA_PIPE searches the tag directory TAGDIR (S16). When a hit does not occur as a result of the search ("NO" in S17), the cache control circuit issues a data request to the memory access control circuit MAC and reads out data from the main memory (S18). When a data response from the MAC is received and input to the cache control circuit (S19), the cache control circuit registers data in the L2 cache memory L2$, registers the data state in the L2 cache tag L2TAG, and responds with data to the processor core of the request source (S20).

Meanwhile, when a hit occurs in the tag directory ("YES" in S17), the cache control circuit issues a data request to the remote CMG possessing the data determined from the CMG identification information CMG_ID in the tag directory (S21). At this time, the cache control circuit changes the lock flag LOCK in the tag directory TAGDIR to the lock state "1."

Then, upon receiving the data response to the data request from the remote CMG, the cache control circuit inputs a data response registration request to the cache control circuit again (S22). In response to this, the cache control circuit registers the data in the L2 cache memory L2$, registers the data state in the L2 cache tag L2TAG, responds with the data to the read request source, and updates the data possession information of the tag directory TAGDIR as necessary (S23). Then, the lock flag LOCK of the tag directory TAGDIR is returned to the unlock state "0."

While the lock flag is in lock, since the state information of the tag directory may be changed even when it is hit by the tag directory search, a read request from, for example, another CMG is aborted and is again returned to the request queue of the input arbitration circuit.

[Replacement Processing]

Figure 11:
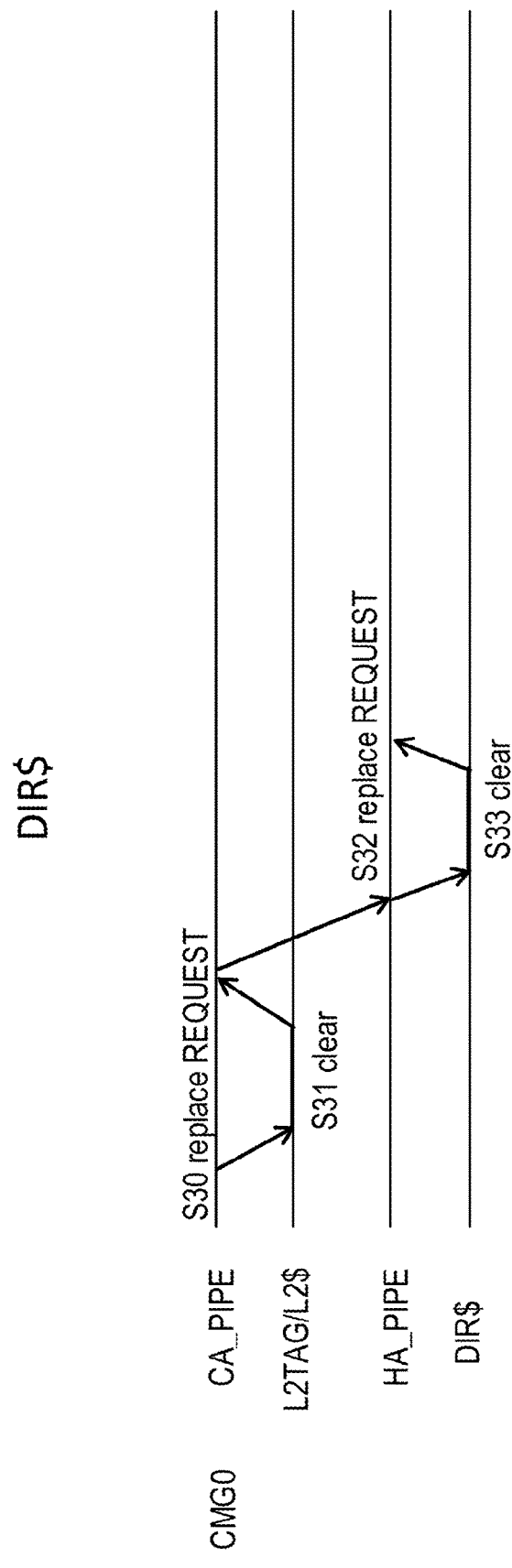
FIG. 11 is a view illustrating a replacement processing in the directory cache scheme of FIG. 2.

FIG. 11 is a view illustrating replacement processing in the directory cache scheme of FIG. 2. For example, the replacement processing is a process of erasing (exporting) data in a cache memory and registering other data.

First, in a certain CMG, a replacement request is input to the cache control circuit of the L2 cache (S30). In response to this, the cache control circuit CA_PIPE invalidates the index of replacement target data in the L2 cache tag L2TAG (S31). Further, the cache control circuit issues a replacement request to the HA control circuit HA_PIPE of the home agent, and the HA control circuit invalidates the index of replacement target data in the directory cache DIR$ (S33). Thereafter, the cache registration processing of the replaced data is performed.

That is, in the directory cache scheme, since the data possession information of the L2 cache memory is recorded in the L2 cache tag L2TAG and the directory cache DIR$, it is necessary to invalidate the index twice as described above.

FIG. 12 is a view illustrating a replacement processing in the tag directory scheme of FIG. 3 according to this embodiment. In a certain CMG, a replacement request is input to the cache control circuit of the L2 cache (S40). In response to this, the cache control circuit CA_PIPE invalidates the index of replacement target data in the L2 cache tag L2TAG (S41). Since the tag directory TAGDIR merely stores data possession information of other CMGs, it is not necessary to invalidate the corresponding index of the tag directory. Therefore, the erase processing of data in the cache memory is ended here.

In this manner, when a cache miss occurs in response to a memory access request such as a read request and the read request cannot be completed within its own CMG, for the first time, the tag directory TAGDIR is accessed to searches the data possession information, or the data possession information of the tag directory is changed when the data state of the remote CMG is changed. Therefore, the amount of processing can be reduced to the extent, thereby saving the power consumption of the memories of the tag directory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An arithmetic processing apparatus comprising:
a plurality of core memory groups, each of core memory groups including
  a plurality of arithmetic processing circuits,
  cache memory circuitry, shared by the plurality of arithmetic processing circuits, including
    a cache memory,
    a cache tag configured to store a state of the cache memory,
    a tag directory configured to store data possession information by a cache memory in another core memory group, and
    a cache memory control circuit configured to receive a second memory access request from the arithmetic processing circuits and a third memory access request from the another core memory group, determine a cache hit by referring to the cache tag in response to the second and third memory access requests, determine a data possession as to whether or not the another core memory group possesses data by referring to the tag directory when it is determined that the cache hit is a cache miss, and issue a data request to request the another core memory group possessing the data to output the data when it is determined that the another core memory group possesses the data, and
a memory access control circuit configured to receive a first memory access request from the cache memory circuitry and control access to a memory other than the cache memory included in the cache memory circuitry.

2. The arithmetic processing apparatus according to claim 1, wherein the cache memory control circuit reads out the data stored in the cache memory when the cache hit determination is a cache hit, and responds with the read data to a request source of the second or third memory access request.

3. The arithmetic processing apparatus according to claim 2, wherein, when it is determined in the data possession determination that the another core memory group does not possess data, the cache memory control circuit issues a first memory access request to request the corresponding memory access control circuit to read out the data of the memory access request.

4. The arithmetic processing apparatus according to claim 1, wherein the data request is a request to request the cache memory control circuit of the another core memory group possessing the data to respond with the data in the cache memory to the core memory group of the data request source and change the data state in the cache tag.

5. The arithmetic processing apparatus according to claim 1, wherein the number of indexes of the tag directory of each of the core memory groups is smaller than the total number of indexes of the cache tags of the other core memory groups.

6. The arithmetic processing apparatus according to claim 1, wherein the number of Ways of the tag directory of each of the core memory groups is equal to the number of Ways of the cache tag of the another core memory group.

7. The arithmetic processing apparatus according to claim 4, wherein the cache memory control circuit changes the data possession information of the tag directory in response to a completion response of the data request.

8. The arithmetic processing apparatus according to claim 1, wherein each index of the tag directory stores the data possession information and core memory group identification information identifying another core memory group possessing the data, and the data possession information is information indicating whether or not to possess the data.

9. The arithmetic processing apparatus according to claim 7, wherein each index of the tag directory further stores a lock flag, and the cache memory control circuit changes the lock flag to a locked state when issuing the data request to the another core memory group, changes the lock flag to an unlocked state after changing the data possession information in response to a completion response of the data request, and aborts the second and third memory access requests when the lock flag is in the locked state, by referring to the tag directory in response to the second and third memory access requests.

10. A control method for an arithmetic processing apparatus including a plurality of core memory groups, each of core memory groups including a plurality of arithmetic processing circuits, cache memory circuitry, shared by the plurality of arithmetic processing circuits, including a cache memory, a cache tag that stores a state of the cache memory, a tag directory that stores data possession information by a cache memory in another core memory group, and a cache memory control circuit that receives a second memory access request from the arithmetic processing circuits and a third memory access request from the another core memory groups, and a memory access control circuit that receives a first memory access request from the cache memory circuitry and controls access to a memory other than the cache memory included in the cache memory circuitry, the method comprising:

determining, by the cache memory control circuit, a cache hit by referring to the cache tag in response to the second and third memory access requests;

determining, by the cache memory control circuit, a data possession as to whether or not the another core memory group possesses data by referring to the tag directory when it is determined that the cache hit is a cache miss; and issuing, by the cache memory control circuit, a data request to request the another core memory group possessing the data to output the data when it is determined that the another core memory group possesses the data.

* * * * *